United States Patent [19]

Roudebush et al.

[11] 4,396,635

[45] Aug. 2, 1983

[54] MICROWAVE CAKE MIX

[75] Inventors: Richard M. Roudebush; Patrick D. Palumbo, both of Cincinnati, Ohio

[73] Assignee: The Procter & Gamble Co., Cincinnati, Ohio

[21] Appl. No.: 396,524

[22] Filed: Jul. 8, 1982

Related U.S. Application Data

[63] Continuation of Ser. No. 239,826, Mar. 2, 1981, abandoned, which is a continuation-in-part of Ser. No. 47,969, Jun. 12, 1979, abandoned, which is a continuation-in-part of Ser. No. 973,411, Dec. 26, 1978, abandoned.

[51] Int. Cl.$^3$ ............................................. A21D 10/04
[52] U.S. Cl. ..................................... 426/243; 426/554; 426/555; 426/561; 426/653; 426/654
[58] Field of Search ....................... 426/243, 552–555, 426/234, 241, 561, 653, 654

[56] References Cited

U.S. PATENT DOCUMENTS 3,615,683 10/1971 Hoynak ............................... 426/241
3,694,230 9/1972 Cooke et al. ........................ 426/555

*Primary Examiner*—Raymond N. Jones
*Assistant Examiner*—Elizabeth A. Hatcher
*Attorney, Agent, or Firm*—Rose Ann Dabek; Julius P. Filcik; Richard C. Witte

[57] ABSTRACT

A method of preparing tender, moist and light cakes using microwave radiant energy is disclosed. A packaged culinary mix especially adapted for preparing microwaved baked goods is also disclosed. This mix comprises sugar and flour, the ratio of sugar to flour being 1.4:1 to 2:1, leavening, 0% to 16% shortening, and about 2% to 10% emulsifier.

19 Claims, No Drawings

MICROWAVE CAKE MIX

CROSS REFERENCE TO RELATED APPLICATIONS

This is a continuation of application Ser. No. 239,826, now abandoned, filed Mar. 2, 1981, which is a continuation-in-part of commonly assigned, copending application Ser. No. 47,969 filed June 12, 1979 which is a continuation-in-part of Ser. No. 973,411, filed Dec. 26, 1978, now abandoned.

TECHNICAL FIELD

The invention relates to prepared culinary mixes which are especially useful for preparing baked goods using microwave radiant energy.

BACKGROUND ART

The use of prepared mixes has greatly simplified the task of preparing baked goods, in particular cakes which contain flour, sugar, shortening, leavening agents and other minor ingredients. To prepare them for use, the aqueous ingredients such as water, milk, or eggs are added to the mix and stirred to form a homogeneous batter. This is subsequently baked to produce a final product. The use of such mixes avoids the problem of assembling the various ingredients, measuring the desired quantities, and mixing them in specified portions.

When the culinary mixes designed for baking in a conventional oven, i.e. using radiant heat, are baked in a microwave oven, a dry, tough unacceptable cake is produced. When the cake batter is baked in a microwave oven using a square pan, the outer edges become dry and tough and the center is not completely baked. Various methods have been used to compensate for the uneven baking in a microwave oven, for example, frequent turning of the cake during baking, elevating the pan from the floor of the oven, using round pans, etc. However, none of these methods provides a suitable way to prepare a moist, light, high cake using microwave radiant energy as the energy source. The addition of extra water or extra oil to the cake batter compensates somewhat for the dry, tough nature but the cake becomes unacceptably dense, small and collapsed. It has now been found that a cake formula that gives decidedly better results in a microwave oven-baked cake than current commercial cake mixes can be produced if the following conditions are met: the sugar and flour must be present in a ratio of 1.4:1 to about 2:1, preferably up to 80% of the total sugar is co-milled with the flour using a multi-impact mill; the shortening is present from about 0% to 16% of the total mix; the emulsifier level is in the range of from about 2% to about 10% by weight of the mix; and the leavening system is a combination of a leavening acid, preferably sodium aluminum phosphate and/or monocalcium phosphate, and a baking soda.

Accordingly, an object of this invention is to provide packaged culinary mixes which can be made into baked goods which are more tender, have better eating qualities, and better appearance than products made from conventional mixes in the microwave oven.

It is a further object of this invention to provide a packaged culinary mix which will also produce an acceptable cake when baked in a conventional oven.

Other objects and advantageous features will be apparent from the following detailed description.

DISCLOSURE OF THE INVENTION

A culinary mix, especially adapted for microwave baking, comprising:
(a) from about 60% to about 85% sugar and flour, the ratio of sugar to flour being from about 1.4:1 to about 2:1,
(b) from about 1% to about 5% leavening,
(c) from about 0% to about 16% shortening,
(d) from about 2% to about 10% emulsifier, and
(e) the balance being conventional cake additives.

When water and eggs are added to this dry mix, a batter is formed which can be baked in the microwave oven to produce a moist, tender consumer-acceptable cake.

The term "conventional cake additives" includes ingredients such as flavors, thickeners, nutrients, antioxidants and antimicrobial agents, non-fat milk solids, egg solids, starches, etc.

Suitable hydrophilic colloids can include natural gum material such as gum tragacanth, locust bean gum, algin, gelatin, Irish moss, pectin, and gum arabic. Synthetic gums such as water-soluble salts of carboxymethyl cellulose can also be used.

Non-fat milk solids which can be used in the composition of this invention are the solids of skim milk and include proteins, mineral matter and milk sugar. Other proteins such as casein, sodium caseinate, calcium caseinate, modified casein, sweet dairy whey, modified whey, and whey protein concentrate can also be used herein. Generally, these solids will be used from about 0% to about 5% of the weight of the dry mix.

Starches can also be added to the mix. Suitable starches include corn, waxy maize, wheat, rice, potato, tapioca and rice starches.

For many mixes it is accepted practice for the user to add the required amount of eggs in the course of preparation and this practice may be followed just as well with the present mixes. If desired, however, the inclusion of egg solids, in particular egg albumen and dried yolk, in the mix are allowable alternatives. Soy isolates may also be used herein in place of the egg albumen.

Dry or liquid flavoring agents may be added to the mix. These include cocoa, vanilla, chocolate, coconut, peppermint, pineapple, cherry, nuts, spices, salts, flavor enhancers, among others. Any suitable flavoring agent used to prepare baked goods can be used herein.

As used herein, baked goods includes cakes, brownies, cupcakes and other types of baked goods which would ordinarily contain a leavening agent.

The ordinary granulated sugars are quite satisfactory for use herein. These include sucrose, dextrose, maltose, fructose, lactose, brown and invert sugars, alone or in combination. The ratio of sugar to flour should be in the range of about 1.4:1 to about 2:1, preferably from about 1.5:1 to about 1.9:1, most preferably from about 1.7:1 to 1.9:1.

Artificial sweeteners can also be used herein, as can the sugar alcohols such as xylitol and mannitol.

The flour can be the usual bleached cake flour, although a good general-purpose flour can be substituted. Flours which have been treated in other manners, to produce flours of the quality of bleached cake flour are also acceptable. Flour can be enriched with additional vitamins and minerals.

The sugar and flour can be mixed with the other ingredients in a conventional manner. Any batch-wise or conventional system for preparing cake mixes can be used herein.

To produce a moist, tender and light cake, however, it is highly preferred that the sugar and flour are co-milled in such a manner that a majority of the particles comprise sugar embedded within the flour particles. At least 80% of the sugar in this system is present as the co-milled sugar/flour particles. The remaining 20% of the sugar may be present as granulated sugar.

The sugar and flour are co-milled using a multi-pass impact mill which employs an internal particle size classifier to return oversize materials for further grinding, or which subjects the material to be treated to repeated grinding actions in several internal stages. These multi-pass impact mills involve a substantial co-action between particles of material being treated.

One of the characterizing effects of the co-milling of the sugar and flour is the formation of combined sugar-flour particles along with the size-reduced sugar particles per se and size-reduced flour particles per se, all of these particles being finely ground. A "combined sugar-flour particle" is a particle comprising individual sugar and flour particles, which have retained their individual identity, but are physically bonded to one another.

A detailed description of the co-milling process is in commonly assigned U.S. Pat. No. 3,694,230, issued to Cooke, Sept. 26, 1972, which disclosure is incorporated in its entirety by reference herein.

The co-milling reduces the particle diameter of the sugar and flour to a particle diameter ranging from about 1 micron to about 150 microns, with a mean particle diameter in the range of from about 10 microns to about 30 microns. The particle diameter of sugar is usually in the range of about 40 microns to about 2000 microns. Similarly, the flour particles are reduced from a size of about 1 micron to about 175 microns to a size from about 1 micron to about 120 microns.

The selection of a chemical leavening system is important in the production of a tender and light cake baked in the microwave. The leavening comprises a baking soda, e.g. sodium, potassium, or ammonium bicarbonate, and a baking acid, preferably either sodium aluminum phosphate and monocalcicum phosphate or mixtures thereof. Preferably, the amount of baking soda comprises from about 1.00% to about 2.50%, the amount of sodium aluminum phosphate comprises from about 0.80% to about 1.00%, and the amount of monocalcium phosphate is from about 0.3% to about 2.0% of the total mix, preferably 1.0 to 2.0%. It is commonly believed that reducing the amount of leavening system for microwave recipes is necessary because of the short baking time. However, to achieve the best height and texture, it has been found that increased amounts of a leavening system comprising a specific combination of the slow-acting leavening agent, sodium aluminum phosphate, and the faster-acting monocalcium phosphate works best.

The emulsifier comprises from about 2% to about 10% by weight of the total mix. When the emulsifier concentration is from about 5% to about 10% by weight of the total mix, no shortening is required to be present in the mix. However, the addition of shortening produces a richer baked product.

Suitable emulsifiers are lactylated mono- and diglycerides, propylene glycol monoesters, polyglycerol esters, sorbitan esters, diacetylated tartaric acid esters of mono- and diglycerides, citric acid esters of monoglycerides, stearoly-2-lactylates, polysorbates, succinylated monoglycerides, acetylated monoglycerides, ethoxylated monoglycerides, lecithin, sucrose monoester, and mixtures thereof.

By "lactylated mono- and diglycerides" are meant lactic acid esters of mono- and diglycerides of fatty acids having from about 14 to 22 carbon atoms, in which from 10% to 35% of the hydroxyls of the glycerides are esterified with lactic acid or polymers of lactic acid. Preferred for use herein is the lactylated monoglyceride of soybean hardstock.

The propylene glycol monoesters used herein are those esters of 1,2-propylene glycol and fatty acids having from 14 to 22 carbon atoms. Preferred propylene glycol monoesters are propylene glycol monopalmitate, propylene glycol monostearate, and propylene glycol monobehenate.

The fatty acids used to esterify the propylene glycol and to prepare the lactylated mono- and diglycerides can be saturated or trans-unsaturated carboxylic acid radicals having from 14, 16, 18, 20 or 22 carbon atoms. A small amount of cis-unsaturated carboxylic acids can be present. Examples of suitable fatty carboxylic acids are myristic, palmitic, margaric, stearic, arachidic, behenate, elaidic and brassidic acids.

Polyglycerol esters suitable for use in the present invention have an average of from 2 to 10 glycerol units and from 1 to 3 fatty acyl groups of from 14 to 18 carbon atoms per glycerol moiety.

Sorbitan esters suitable for use in the present invention have from 1 to 3 fatty acyl groups having from 14 to 18 carbon atoms each. Preferred sorbitan esters have one fatty acyl group having from 14 to 18 carbon atoms.

The preferred succinylated, acetylated, and ethoxylated monoglycerides are those having acyl groups from about 14 to about 18 carbon atoms.

A preferred mixture of emulsifiers is propylene glycol monoesters and lactylated mono- and diglycerides, the ratio of propylene glycol monoesters to lactylated mono- and diglycerides being from 0.4:1 to 1:1. Also preferred is a mixture of propylene glycol monoesters and polyglycerol esters, the ratio of propylene glycol monoesters to polyglycerol esters being from 1:1 to 2.2:1.

A more preferred mixture of emulsifiers is a mixture of propylene glycol monoesters, lactylated mono- and diglycerides and polyglycerol esters. The preferred mixtures are those containing the emulsifiers in the following proportions:

| | |
|---|---|
| polyglycerol esters | 4 to 12 |
| propylene glycol monoesters | 10 to 30 |
| lactylated mono- and diglycerides | 2 to 15 |

A highly preferred mixture is 1 part polyglycerol esters, 2 parts propylene glycol monoesters of palm oil, and 1 part of lactylated monoglycerides.

The shortening comprises from 0% to 16% by weight of the total mix, preferably from 4% to 10%.

The shortening suitable for use herein can be plastic or fluid; however, a major part of the shortening is usually a liquid oil.

The oil portion of the shortening can be derived from naturally occurring liquid triglyceride oil such as cottonseed oil, soybean oil, peanut oil, rapeseed oil, sesame oil, coconut oil, corn oil, and sunflower seed oil. Also suitable are liquid oil fractions obtained from palm oil, lard and tallow, as for example, by graining or directed interesterification, followed by separation of the oil. Oils predominating in glycerides of unsaturated acids may require some hydrogenation to maintain flavor.

Of course, mixtures of the above oils or other oils can also be used herein as can solid fatty materials, such as saturated triglyceride fats. In general, from about 1.5% to about 20% of triglycerides which are solid at 25° C. can be added to a liquid oil. At least about 80% of the fatty glycerides should be in a beta phase.

Fish oils such as herring, menhaden and whale oil can also be used herein.

The preferred shortenings are soybean oil, hydrogenated soybean oil, corn oil, palm oil, hydrogenated palm oil, lard and tallow oils.

To produce a cake mix, the emulsifier is first dissolved in the oil or fat to produce an emulsified shortening. For best results, the emulsifier is melted and added to the shortening at a temperature above the melting point of the emulsifier to insure a homogeneous blend. Any conventional methods of incorporating the emulsifier and shortening into the mix can also be used.

The flour, sugar, leavening agent, emulsified shortening, and additional ingredients are then mixed together in a conventional manner to produce the cake mix. For example, the emulsified shortening and other ingredients can be combined with the sugar, flour or co-milled sugar-flour mixture by admixing these components in a planetary bowl mixer, a ribbon blender, a high-speed rotary mixer, or in other conventional mixers. Preferably, however, the shortening containing the emulsifier is first mixed with the sugar-flour mixture, for example, in a paddle mixer, a ribbon blender, or a high-speed rotary mixer to form an essentially homogeneous sugar-flour-shortening-emulsifier blend, and then the additional ingredients are admixed (also in a conventional mixer) with this blend.

A batter is prepared from the culinary mix by combining it with aqueous ingredients such as water or milk and eggs. For an even moister cake, additional oil can be added to the batter. The batter comprises from 45% to 70% of the dry mix; from 20% to 40% aqueous ingredients; from 8% to 25% eggs, egg solids or proteins; and from 0% to 15% additional vegetable or animal oil.

The batter resulting from this mixing process is poured into a cake pan and baked in the microwave oven.

Several bands of frequencies are available for microwave cooking. These frequencies are in the range of 900 megacycles, 2400 megacycles, 5700 megacycles, and 3300 megacycles. It is preferable to use microwave frequencies of 2450±1000 megacycles for the practice of the present invention.

The exact cooking time will depend upon the frequency of the microwave energy used, and the amount of batter.

All types of flavor and sugar-based prepared cake mixes can be made in the microwave oven using the above compositions. Yellow cakes, chocolate cakes, devil's food cakes, marble cakes, spice cakes, pineapple cakes, and many other layer cakes of excellent quality can be prepared simply by adding water and eggs to the dry mix in a single mixing step or multiple mixing steps followed by microwave baking.

It is a particular advantage of the present invention that the ingredients can be conveniently provided to the consumer in such a way as to make it especially convenient for the consumer to make consistently good microwave baked cakes.

The batter prepared herein can also be baked in a conventional oven and produce a consumer acceptable cake.

EXAMPLE 1

| Ingredients | Amount |
|---|---|
| Sugar | 51.45% |
| Flour | 33.2% |
| Shortening* | 6.5% |
| Emulsifier** | 3.5% |
| Dextrose | 0.43% |
| Non-fat milk solids | 1% |
| Sodium bicarbonate | 1.18% |
| Monocalcium phosphate | 0.4% |
| Sodium aluminum phosphate | 0.93% |
| Salt | 0.37 |
| Carboxymethyl cellulose | 0.2 |
| Butter flavor | 0.185 |
| Coloring | 0.2 |
| Other flavorants | 0.16 |
| Enrichment | 0.01 |

*The shortening comprises hydrogenated soybean oil.
**The emulsifier comprises propylene glycol monostearate and the lactic acid ester of monoglycerides of hydrogenated soybean oil in a 1:1 ratio.

The sugar and flour are co-milled according to the process described in U.S. Pat. No. 3,694,230, issued to Cooke (1972). The propylene glycol monostearate and lactylated monoesters of soybean oil are melted and then mixed with the shortening at about 145° F. The shortening and sugar-flour mixture are mixed together and then the remaining ingredients mixed in a ribbon blender. The yellow cake mix is then used to prepare a cake as follows:

| Ingredients | Amounts |
|---|---|
| Example 1 Mix | 270 grams |
| Water | 120 |
| Eggs | 96 |
| Vegetable oil | 55 |

The above ingredients are mixed for 2 minutes at medium speed to form a batter. This batter is then poured into an 8-inch round plastic microwave cake pan and baked in a conventional home microwave oven for 7 minutes on the defrost or low cycle and then 3½ minutes on the high baking cycle. A light, fine-textured even grained layer cake is produced.

EXAMPLE 2

The dry mix of Example 1 is used to prepare three different batters and to prepare three different cakes. In the control experiment (A), two eggs and ¼ cup of vegetable oil are added to 270 grams of the mix and a half-cup of water to produce the batter as in the previous Example. In experiment (B), one egg and ¼ cup oil was used, and in experiment (C), 2 eggs and no oil were used to produce the cake. Table I summarizes the results.

TABLE I

| Product Characteristics | A | B | C |
|---|---|---|---|
| Height (center) | 1.75 in. | 1.33 in. | 2.00 in. |
| Batter density | 0.72 | 0.76 | 0.72 |
| Batter viscosity | 46 | 36 | 40 |

TABLE I-continued

| Product Characteristics | A | B | C |
|---|---|---|---|
| Texture | light, fine textured grain | compacted grain | very light, open grain |
| Eating quality | Tender, moist | Very moist, gummy | Slightly less moist, moderately tougher than A |

A fourth cake was prepared as in Example I using 270 grams of a yellow cake mix, Duncan Hines Deluxe II Cake Mix, which produces a light, fine-textured grain cake when baked in a conventional oven. A batter was prepared as above. The cake height was 1.40 inches, the batter viscosity 28, the batter density 0.79. The cake texture was very heavy and had a compacted grain. The eating quality was gummy, chewy, and had a poor mouth melt.

Batter viscosity was measured using a Brookfield viscometer Model RVT ½, a T-spindle size B, and a speed of 10 rpm. The higher the number, the more viscous the batter.

EXAMPLE 3

| Ingredients | Percent |
|---|---|
| Sucrose | 46.0 |
| Dextrose | 3.8 |
| Enriched flour | 30.7 |
| Baking soda | 1.4 |
| Monocalcium phosphate | 1.7 |
| Shortening | 5.0% |
| Polyglycerol ester | 1.7% |
| Propyleneglycol monopalmitate | 3.3% |
| Non-fat milk solids | 1.0 |
| Carboxymethyl cellulose | 0.2 |
| Coloring | 0.02 |
| Starch | 3.48 |
| Salt | 0.5 |

The emulsifiers are melted and mixed with the shortening at about 165° F. The emulsified shortening is cooled to about 150° F. and mixed with co-milled sugar and flour in a ribbon blender. The remaining ingredients are then added in a ribbon blender.

A total of 255 grams of this mixture is mixed with 160 grams of water, and 96 grams of eggs in a conventional electric mixer at high speed for 2 minutes to form a batter. This batter is then poured into an 8-inch round microwave cake pan and baked in a conventional home microwave oven for 3.5 minutes on the defrost or low cycle and 3 minutes on the high cycle.

A light, fine-textured even grain cake is produced.

EXAMPLE 4

| Ingredients | Percent |
|---|---|
| Sucrose | 48.5 |
| Dextrose | 3.6 |
| Enriched flour | 27.8 |
| Baking soda | 1.3 |
| Monocalcium phosphate | 0.8 |
| Sodium aluminum phosphate | 0.44 |
| Salt | 0.5 |
| Carboxymethyl cellulose | 0.20 |
| Shortening | 6.6 |
| Polyglycerol ester* | 1.4 |
| Propylene glycol monopalmitate | 1.0 |
| Propylene glycol monobehenate | 0.6 |
| Lactic acid emulsifier** | 0.5 |
| Non-fat milk solids | 1.0 |
| Starch | 5.3 |
| Coloring | .2 |
| Flavors | .26 |
| | 100.00 |

*Santone 815 from Durkee Foods
**Monoglycerol esters of soybean oil

The emulsifiers are melted and mixed with the shortening at about 165° F. The emulsified shortening is cooled to about 150° F. and mixed with co-milled sugar and flour in a ribbon blender. The remaining ingredients are then added in a ribbon blender.

A total of 283 grams of this mixture is mixed with 160 grams of water, and 96 grams of eggs in a conventional electric mixer at medium speed for 2 minutes to form a batter. This batter is then poured into an 8-inch round microwave cake pan and baked in a conventional home microwave oven for 3.5 minutes on the defrost or low cycle, and 3 minutes on the high cycle.

A light, fine-textured even grained cake is produced.

When the emulsifier composition used in Example 4 is altered as follows:
polyglycerol ester 1.2%
propylene glycol monopalmitate 2.0%
lactic acid monoglycerides 0.8%
and 6.1% shortening is used, and everything remains the same, similar results are achieved.

We claim:
1. A culinary mix for preparing microwave baked goods comprising:
   (a) from about 60% to about 85% sugar and flour, the ratio of sugar to flour being from 1.4:1 to about 2:1;
   (b) from about 1% to about 5% of a leavening system comprising from about 1% to about 2.5% of sodium bicarbonate, potassium bicarbonate or ammonium bicarbonate or mixtures thereof, from about 0% to about 1% sodium aluminum phosphate, and from about 0.3% to about 2% monocalcium phosphate;
   (c) from about 0% to about 16% shortening;
   (d) from about 2% to about 10% emulsifier, said emulsifier consisting essentially of a member selected from the group consisting of:
      (i) mixtures of propylene glycol monoesters and lactylated mono- and diglycerides in a ratio of 0.4:1 to about 1:1;
      (ii) mixtures of propylene glycol monoesters and polyglycerol esters in a ratio of 1:1 to 2.2:1;
      (iii) a mixture consisting of 4 to 12 parts polyglycerol esters, 10 to 30 parts propylene glycol monoesters, and 2 to 15 parts lactylated mono- and diglyceride;
   (e) the balance being conventional cake additives.
2. A mix according to claim 1 wherein said shortening comprises from 4% to about 10% of said mix and said emulsifier consists essentially of from 2% to about 6% of said mix.
3. A mix according to claim 2 wherein said emulsifier consists essentially of mixtures of lactylated mono- and diglycerides and propylene glycol monoesters.
4. A mix according to claim 3 wherein said emulsifier consists essentially of a 1:1 ratio of propylene glycol monostearate and lactic acid esters of monoglycerides of hydrogenated soybean oil.

5. A mix according to claim 1 wherein said emulsifier consists essentially a mixture of propylene glycol monoesters and polyglycerol esters.

6. A mix according to claim 5 wherein the ratio of said propylene glycol monoesters to said polyglycerol esters is from 1:1 to 2.2:1.

7. A mix according to claim 6 wherein said propylene glycol monoester is propylene glycol monostearate or propylene glycol monopalmitate or mixtures thereof.

8. A mix according to claim 1 wherein said emulsifier consists essentially of a mixture of 2 parts propylene glycol monoesters of palm oil, 1 part polyglycerol esters and 1 part lactylated mono- and diglycerides.

9. A mix according to claim 8 wherein said propylene glycol monoester is selected from the group consisting of propylene glycol monopalmitate, propylene glycol monobehenate and mixtures thereof.

10. A mix according to claims 3, 5 or 8 wherein said leavening system comprises from about 1% to about 2.50% sodium bicarbonate or potassium bicarbonate, from about 0.8% to about 1% sodium aluminum phosphate, and from about 0.3% to about 0.5% monocalcium phosphate.

11. A mix according to claims 7 or 8 wherein said leavening system comprises from about 1% to about 2.50% sodium bicarbonate or potassium bicarbonate and from 1.0% to 2.0% monocalcium phosphate.

12. A mix according to claims 1, 4, 5 or 8 wherein the sugar and flour are co-milled.

13. A mix according to claim 12 wherein the ratio of sugar to flour is from about 1.5:1 to about 1.9:1.

14. A mix according to claim 13 wherein said shortening is selected from the group consisting of soybean oil, hydrogenated soybean oil, corn oil, peanut oil, palm oil, hydrogenated palm oil, lard or tallow.

15. A batter for preparing microwave baked goods, comprising:
(a) from 45% to 70% of the culinary mix of claim 1;
(b) from 20% to 40% aqueous ingredients;
(c) from 8% to 25% egg through egg solids;
(d) from 0% to 15% vegetable or animal oil.

16. A batter according to claim 15 wherein said emulsifier comprises a mixture of lactylated mono- or diglycerides and propylene glycol monoesters.

17. A batter according to claim 16 wherein the sugar and flour in the culinary mix are co-milled.

18. A batter according to claim 17 wherein the shortening in the culinary mix is selected from the group consisting of soybean oil, hydrogenated soybean oil, corn oil, peanut oil, palm oil, hydrogenated palm oil, lard or tallow.

19. A process for baking a cake comprising preparing a batter according to claim 15 and baking said batter using microwave radiant energy.

* * * * *